(12) United States Patent
Socher

(10) Patent No.: US 6,697,336 B1
(45) Date of Patent: Feb. 24, 2004

(54) METHOD TO CONFIGURE A COMMUNICATION LINK FOR A DATA TRANSMISSION

(75) Inventor: Guido Socher, Herzogenrath (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/428,340

(22) Filed: Oct. 27, 1999

(30) Foreign Application Priority Data

Oct. 30, 1998 (EP) .......................................... 98120704

(51) Int. Cl.$^7$ ............................................. G01R 31/08
(52) U.S. Cl. ......................... 370/252; 370/254; 379/202
(58) Field of Search ................................. 370/249, 236, 370/465, 468, 252, 254; 375/222

(56) References Cited

U.S. PATENT DOCUMENTS

| | | | |
|---|---|---|---|
| 5,077,732 A | | 12/1991 | Fischer et al. .............. 370/85.4 |
| 5,452,287 A | * | 9/1995 | DiCecco ....................... 370/17 |
| 5,572,582 A | | 11/1996 | Riddle ......................... 379/202 |
| 5,621,894 A | * | 4/1997 | Menezes ................. 395/200.12 |
| 5,644,715 A | | 7/1997 | Baugher ................. 395/200.04 |
| 5,708,778 A | | 1/1998 | Monot ..................... 395/200.1 |
| 5,719,942 A | * | 2/1998 | Aldred ......................... 380/49 |
| 6,046,985 A | * | 4/2000 | Aldred ....................... 370/252 |

FOREIGN PATENT DOCUMENTS

| | | |
|---|---|---|
| EP | 0364866 A | 4/1990 |
| EP | 0 494 576 A1 * | 7/1992 |
| EP | 0494576 A1 * | 7/1992 ........... H04L/29/06 |
| WO | WO 9748212 A | 12/1997 |

OTHER PUBLICATIONS

Vaskimo, K.; European Search Report; EPO app. No. EP98120704; Apr. 13, 1999; pp. 1–4.

* cited by examiner

Primary Examiner—Dang Ton
Assistant Examiner—Robert W. Wilson

(57) ABSTRACT

The invention relates to a method and a device for the optimized negotiation of communication parameters for a transmission of data in communication links. A list is initialized in a communication initializing device and is sent one after another to all devices involved in the communication during the connection set-up phase. Each of the devices adds its own and most suited transmission parameters to the list. Said parameter list is sent to the communication initializing device by the last device involved in the communication. The initializing communication device finally selects the transmission parameters. The parameter list established in this way is one after another sent to all devices involved in the transmission to inform them on the valid parameter selection. Each device configures its parameter setting for a corresponding connection by means of the received parameter list. Thus, a configuration of the devices involved in the communication is effected for the subsequent data transmission.

18 Claims, 4 Drawing Sheets

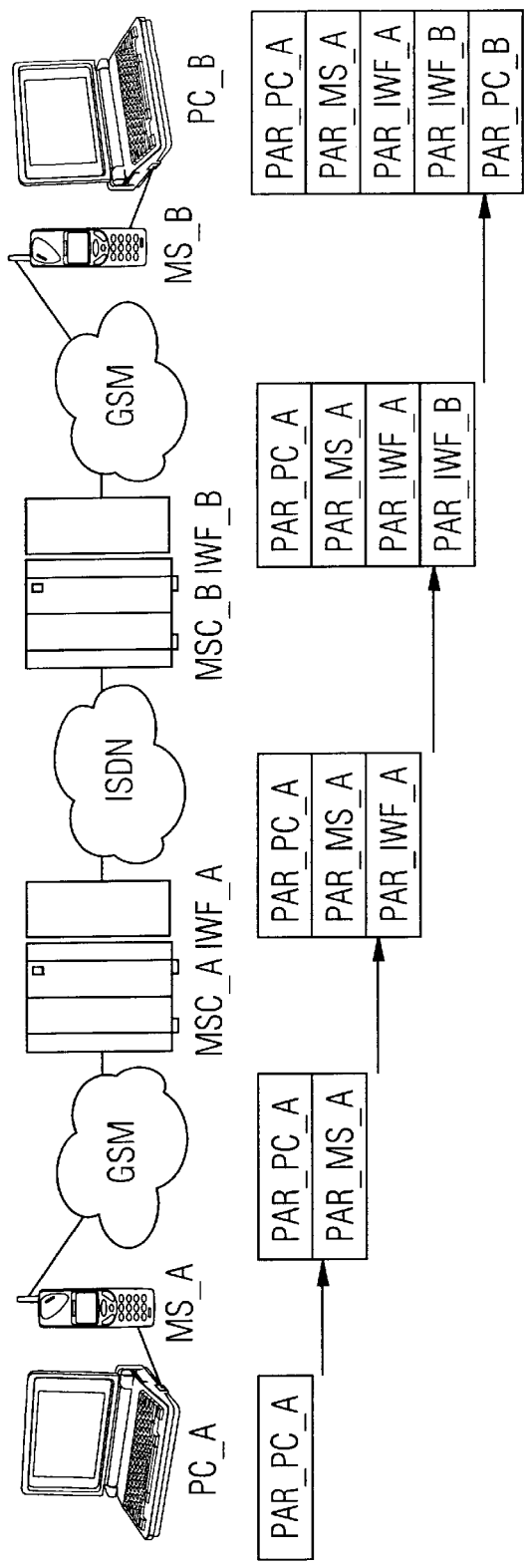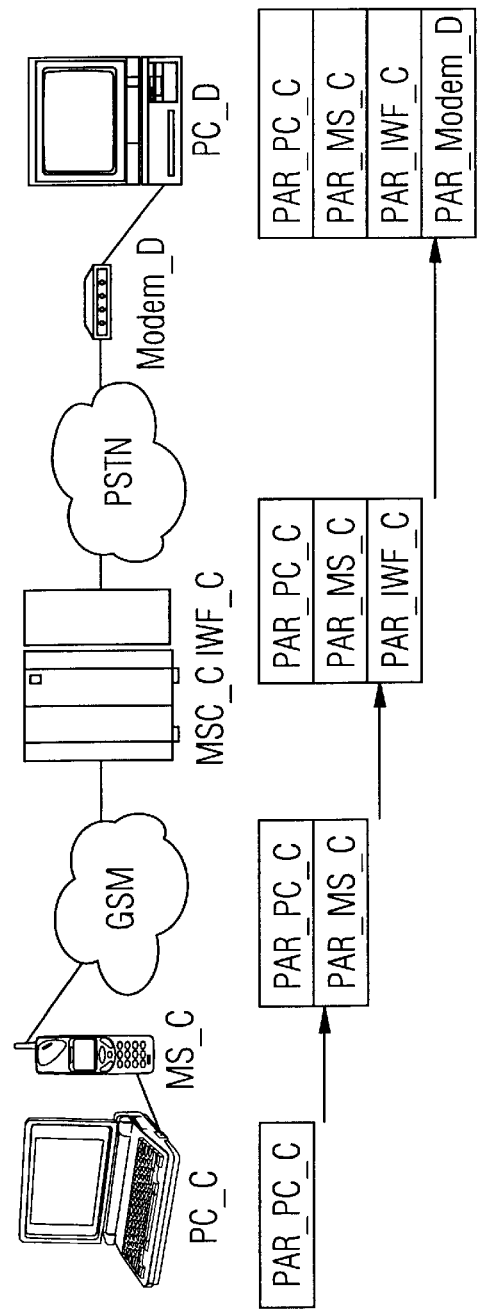

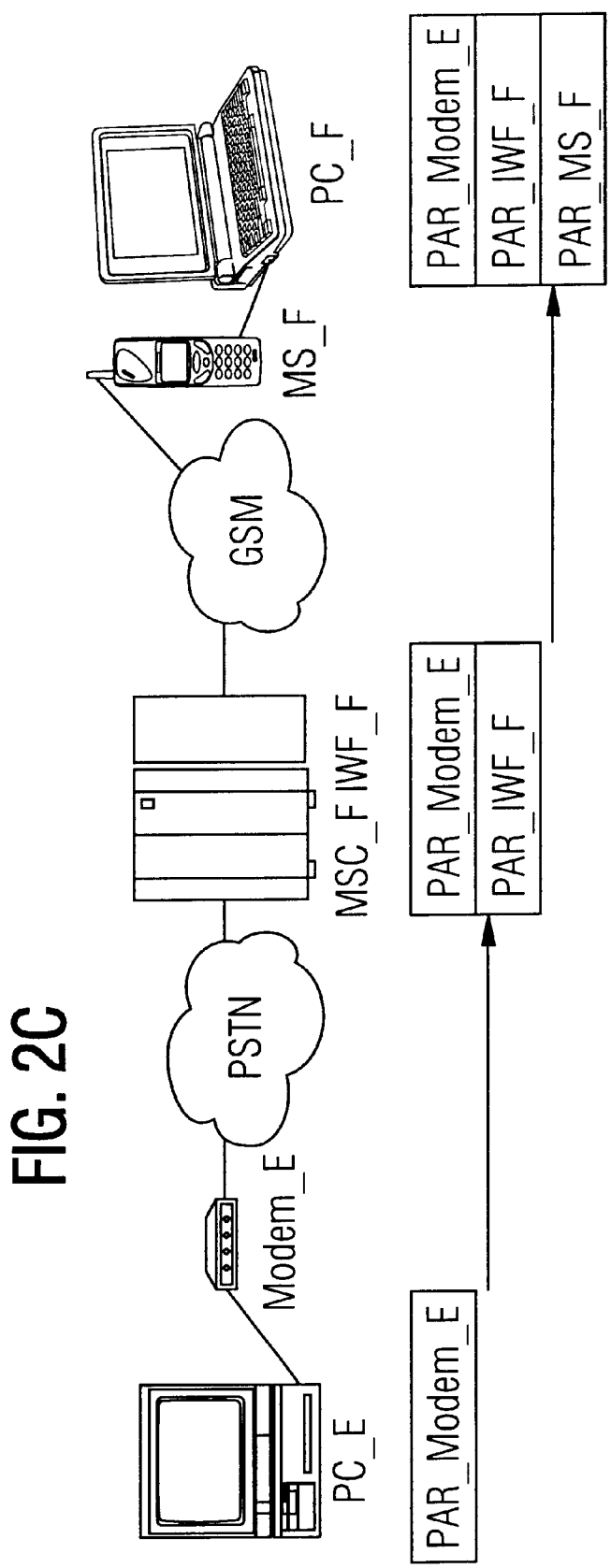

METHOD TO CONFIGURE A COMMUNICATION LINK FOR A DATA TRANSMISSION

BACKGROUND OF THE INVENTION

TECHNICAL FIELD OF THE INVENTION

The invention relates to a method and a device for the optimized negotiation of communication parameters for the transmission of data on communication links.

A communication link is a coupling of at least two data terminals for the purpose of exchanging information. The line may be either generated for a specified time or is constantly available. The information is presented in form of a string of digital signals called bytes. The transmission of the bytes can take place in an analog or digital manner. An analog transmission, for instance, takes place in a conventional telephone network (so-called public switched telephone network (PSTN)). The analog transmission of data requires, however, a conversion of the digital signals into audio frequency signals, which are sent via the line. This is realized by means of a modulation method. The analog signals received by the receiver are demodulated and converted into digital signals. For this purpose modems are used between a data terminal equipment and the analog telephone network. Thus, the modems have the task of providing the digital signals sent by the data terminal equipment to the transmission link, which constitutes an analog transmission medium, and of adopting the received signals of the transmission link to the physical conditions of the data terminal equipment.

Another possibility of transmitting data consists in applying a digital switching technique. Said technique is, for instance, used in the widely spread ISDN (Integrated Services Digital Network) network. It is the aim of the network to obtain an integration of different telecommunication services in one universal telecommunication network. This particularly means that up to eight different or identical terminals, for example, telephone, fax, computer, videophone, can be connected to an ISDN access via a uniform interface. Another property of the network consists in the data transmission of 64 kbit/s for all services. Important standards for the data communication via ISDN are ETS 300 102-1, ITU-T I.411 and ITU-T V.110.

Another network forming part of the category of digital networks is the digital mobile communication network GSM (Global System for Mobile Communication). The usable data transmission rate is 9.6 kbit/sec per channel. When the GSM system was designed, it was particularly considered important to make services, that had previously been accessible via the conventional telephone network or ISDN, also accessible to GSM users. This refers to services such as facsimile, source data transmission or the access to data networks such as the internet. GSM offers the possibility to set up a connection to another ISDN and PSTN subscriber. In order to meet this requirement, networks of different types have to be coupled with each other. In this connection, i.e. the coupling of several networks, the term heterogeneous network is introduced and used therefor in the following.

As was already explained above, the networks differ from one another due to the transmission rate. Moreover, there is a plurality of additional parameters, which either have to be set or can be set optionally, the configuration of which, however, considerably influences the efficiency of the transmission.

For instance, in order to guarantee synchronization of data between a transmitter and a receiver, a choice has to be made between a synchronous or asynchronous transmission. In asynchronous transmission there is no common time pulse. The synchronization of the transmission is done by sending start and stop bits. Said bits enclose small amounts of data produced with the transmitter by means of fragmentation of complete messages, which are reassembled with the receiver so as to form complete messages. This, however, requires an agreement between the communicating units in view of the form of transmission. In this respect, the more efficient, i.e. the synchronous form of transmission can be applied. With the synchronous transmission an identical time pulse is required by both the transmitter and the receiver. The transmission of the pulse can take place in different ways, such as on a separate pulse line, or the clock pulse may be derived from the data stream by means of a PLL. Thus, it is however absolutely necessary to have both data terminal equipment adjusted identically. Said decision is to be made by the user, wherein it has to be taken into account that presently the synchronous type of transmission holds the status of a new service with the result that it is not already implemented by all network providers. This has, therefore, to be inquired by the user. Further important parameters, which are necessarily to be agreed upon if the GSM network is involved in the transmission, refer to the transmission mode, in particular to the so-called transparent or the so-called non-transparent mode. The essential distinguishing feature is that in addition to the standard error-correcting mechanisms an additional method for correcting faulty transmitted data as well as for the buffering of data is applied in the so-called non-transparent mode. This is of significance in case of a faulty transmission channel with which the GSM is characterized. The corresponding transmission mode is selected by the user and depends on the network. Thus, the user is also required to have knowledge in view of the configuration of connections.

The two above-discussed services—synchronous/asynchronous and transparent/non-transparent—only form one part out of a plurality of different services. Their number and kind varies in response to the underlying network.

For the adoption of the transmission parameters not only the underlying network, e.g. ISDN, GSM or analog: PSTN, but also the kind of the terminal used by the data terminal equipment is important. On one hand, the kind of the terminal depends on the underlying network, e.g. in analog networks a modem is applied and a terminal adapter (TA) in digital ones. On the other hand, there are differences in view of the parameters between the terminals of the same kind. The parameters may, for instance, vary on the basis of the transmission rate, e.g. 14.4 kbits/s, 28.8 kbits/s and 33.3 kbits/s.

When looking at a heterogeneous connection, at least one intermediate node is involved beside the terminals in data transmission, the task of which is to adopt the linked partial paths in view of the given network characteristics. For instance, a component called InterWorking Function (IWF) integrated in the GSM switching center (so-called mobile services switching center (MSC)) is responsible for adopting the transmission carriers between GSM and external networks. Said function converts the different modulation and signaling methods into one another. The conversion methods differ from one another due to the network connected between the InterWorking Function and the subsequent data terminal equipment. The cooperation between a mobile phone and an InterWorking Function is described in standard GSM 09.07.

It is, however, a problem that it is sometimes difficult for an InterWorking Function to make a difference as to whether the subsequent data terminal equipment is connected to a digital or an analog network. The InterWorking Function generally recognizes on the basis of the kind of switching center, to which the data terminal equipment is connected, which kind of data terminal equipment is concerned. This does not take place, however, if the subscriber is in another national network and the connection is set up via several networks, where intermediate nodes use a different kind of signaling, called National User Part Signaling. Said kind of switching node may support the transmission rate of 64 kbits/s, however, uses signaling protocols which deviate from the ISDN Standard. This can result in problems when selecting the transmission parameters through the InterWorking Function.

The data terminal equipment, which refers to both the terminals and the intermediate nodes, have the task to assure a parameter agreement such that a safe and stable data transmission between the communicating data terminal equipment is guaranteed. The parameter adjustment between the data terminal equipment takes place in the set-up phase of the connection. An example of a parameter agreement during a set-up phase of a connection is introduced in the following by means of a connection between two GSM subscribers.

For transmitting data with a mobile phone, said mobile phone has to have the possibility to connect a corresponding input and output device therewith, and it has to support the necessary protocols. The input and output device is a computer, e.g. a portable computer. The data transmission in a mobile environment can also be realized by means of a special device, into which both functions, namely of a computer and of a mobile phone, are integrated. The connection between both data terminal equipment takes place via a digital interface, e.g. a PCMCIA (Personal Computer Memory Card Industry Association) card. The function thereof together with the mobile phone corresponds in the larger sense to the function of a modem. This is seen in a larger sense only, as the PMCIA card does not perform a modulation or demodulation due to the fact that it connects two digital devices.

The controllability of said card is obtained by using AT-commands. The AT-commands describe the programming language standardized under the modems. The application of the AT-commands allows the user to set the transmission parameters, such as the setting of the modem type, the transmission rate, the type of transmission (synchronous/asynchronous). In digital networks said settings are converted into the so-called bearer capability. The concept of the bearer capability was introduced in the standardization of the ISDN network and adopted to said standard in GSM standardization. The bearer capabilities deliver information on the transmission capability of data between data terminal equipment. The description of the GSM bearer capability can be inferred from GSM 04.08 and that of the ISDN bearer capability from ETSI Q.931.

The bearer capability thus describes the telecommunication service. In case of GSM the connection parameters set by the user are translated into a bearer capability, which is sent to the mobile service switching center (MSC) as a signaling message during the connection set-up phase. The bearer capability is analyzed in the MSC, and in response to the preferences of the MSC the following cases can occur.

First case: The connection is disconnected. The user can understand this to be an indication for the incorrectly set parameters. The cause of the disconnection is transmitted to the subscriber in the form of a briefly drafted information, from which the actual cause cannot be inferred, e.g. "carrier not supported". When this case occurs, it is expected by a user to try with a different parameter setting. Said manual settings and attempts require in any case knowledge by the user.

Second case: The MSC selects parameters other than the ones it had been sent. The newly specified parameters are transmitted to the user. A logic in the mobile phone then decides whether it can accept the parameters or whether it should disconnect.

In the third case the MSC accepts the parameter setting, whereupon stand-by to support the service desired by the user is signalized.

As a result of the acceptance of the parameters in the GSM switching center, i.e. when the third case occurs, or when, in the second case, the parameters are accepted by the mobile phone, the connection set-up process is continued by including the InterWorking Function. In response to the type of transmission, either digital or analog, the connection is switched further into an analog network such as PSTN via a modem, or into a digital network such as ISDN via an ISDN adapter. If the connection is switched via an ISDN network, a translation of the bearer capability by means of the InterWorking Function takes place at the coupling points. Due to the fact that said parameters are different from one another in the two networks in view of the different bit occupancy and the different data fields, the incorrect parameter translation or loss of information can be the result. In particular, ISDN does not support the so-called autobaunding, which is characteristic for a modem communication. The so-called auto-baunding procedure permits a dynamic negotiation of the transmission rate and the modulation. Said procedure provided for analog data terminal equipment is, however, not supported in the pure digital ISDN network.

At the time of the parameter translation from GSM to ISDN on the side of the calling subscriber is not yet known, whether the data call will terminate in the ISDN network or goes to a switching center, as this cannot be determined on the basis of the signaling. The auto-baunding is, therefore, represented in the bearer capability field being responsible for the transmission rate by means of a special bit combination. In case there is a GSM switching center on the side of the subscriber called, the information fields of the bearer capability are retranslated. The special bit combination for auto-baunding is thereby interpreted such that the highest possible supported data rate of the calling subscriber is selected. The maximum possible data rate of the calling subscriber, however, is unknown as the bearer capability field responsible for the transmission rate is occupied with the information auto-baunding. If, moreover, the transparent transmission mode is selected, the data connection will fail if the called subscriber supports a data rate higher than that of the calling subscriber. The so-called non-transparent mode permits an intermediate storage and buffering of the data in the InterWorking Function, in case the transmission rates of the transmitting and receiving side differ from each other. If, however, the setting to the transparent mode is active, the intermediate storage of data is not permitted, and at different transmission rates this can result in a data accumulation and data loss as a consequence thereof. During the connection set-up phase this is recognized to be a problem as a result of which the connection is discontinued.

If the connection between a mobile subscriber and the corresponding InterWorking Function (IWF) is set up successfully, a parameter negotiation between the subscriber's MSC and the target subscriber is started. The parameters are transmitted in a signaling message to the mobile-phone of the called subscriber, which can decide whether the parameters are to be accepted or modified. The possibly modified parameters are sent back to the switching center of the target subscriber, which can accept them or disconnect the connection. Thereupon, the data terminal equipment are connected and the data transmission starts.

In case of heterogeneous connections, in which case different networks and data terminal equipment are involved in the transmission of information, it is difficult due to the different parameters, which have to be known in advance and have to be configured correctly, to set up a stable and safe connection between two data terminal equipment. The incompatibility between the different networks in view of the transmission parameters frequently entails the disconnection during the connection set-up. In order to perform a successful connection set-up it is presently required to know all parameters of the network and the opposite terminal. Thus, experience in the field of connection configuration by the user is required. On the other hand, not all services are supported by all network providers. At present, for instance, the synchronous transmission type is said to be a new service, which results in that it is not implemented by all network providers. The user also has to obtain information in this respect prior to his wish to set up a connection.

In most cases where the call is disconnected during set-up, an error analysis is very difficult or impossible. This means that the user is not in a position to obtain information on the cause of the error, as the error messages sent by the network contain information only to a small extent. Upon receipt of such information the user can attempt only intuitively to set up a new connection with other parameters.

Accordingly, it is the object of the invention to provide a method and a device setting up a connection to any target device by guaranteeing an optimized transmission. It is particularly an object of the invention to set up a connection to a target device, the parameters of which are unknown, also by guaranteeing an optimized transmission.

BRIEF DESCRIPTION OF THE INVENTION

According to the invention this object is provided by means of the teaching of patent claim 1 and the teaching of patent claim 14.

Through the analysis of the list of parameters received by the communication initializing unit, a determination of communication link bottlenecks and errors is possible. This can prove to be particularly advantageous for network providers, as they are put in the position to send more exact error information to users.

It is also advantageous that a communication link is set up via a heterogeneous network.

Another advantage is that a subsequent connection to the same target device is optimized by storing the parameter setting of the once set-up connection and by re-using it with the next connection set-up.

Another advantage is also that said protocol does not define the type and number of the parameters admitted to the negotiation. With this protocol also parameters are negotiated, which are specific for a partial connection only, e.g. only for GSM.

Another advantage is also that due to the protocol being independent of the devices involved in the transmission, an update of a device in view of software or hardware takes place without having to use the functionality of the whole system.

It is also advantageous that a user being inexperienced in the configuration of a communication link can set up a communication link to any target terminal device.

Further advantages of the invention can be inferred from the dependent claims 2 to 13.

In the following, the invention is explained in more detail by means of embodiments, tables and figures.

DESCRIPTION OF THE DRAWINGS

The following figures show:

FIGS. 2a, b, c: an illustration of an embodiment according to the invention,

DESCRIPTION OF THE DRAWINGS

In the following, the invention is explained by means of an embodiment and by means of FIG. 1. In this respect it is to be noted that the term communication initializing device is hereinafter used synonymously with first device.

Figure 1:
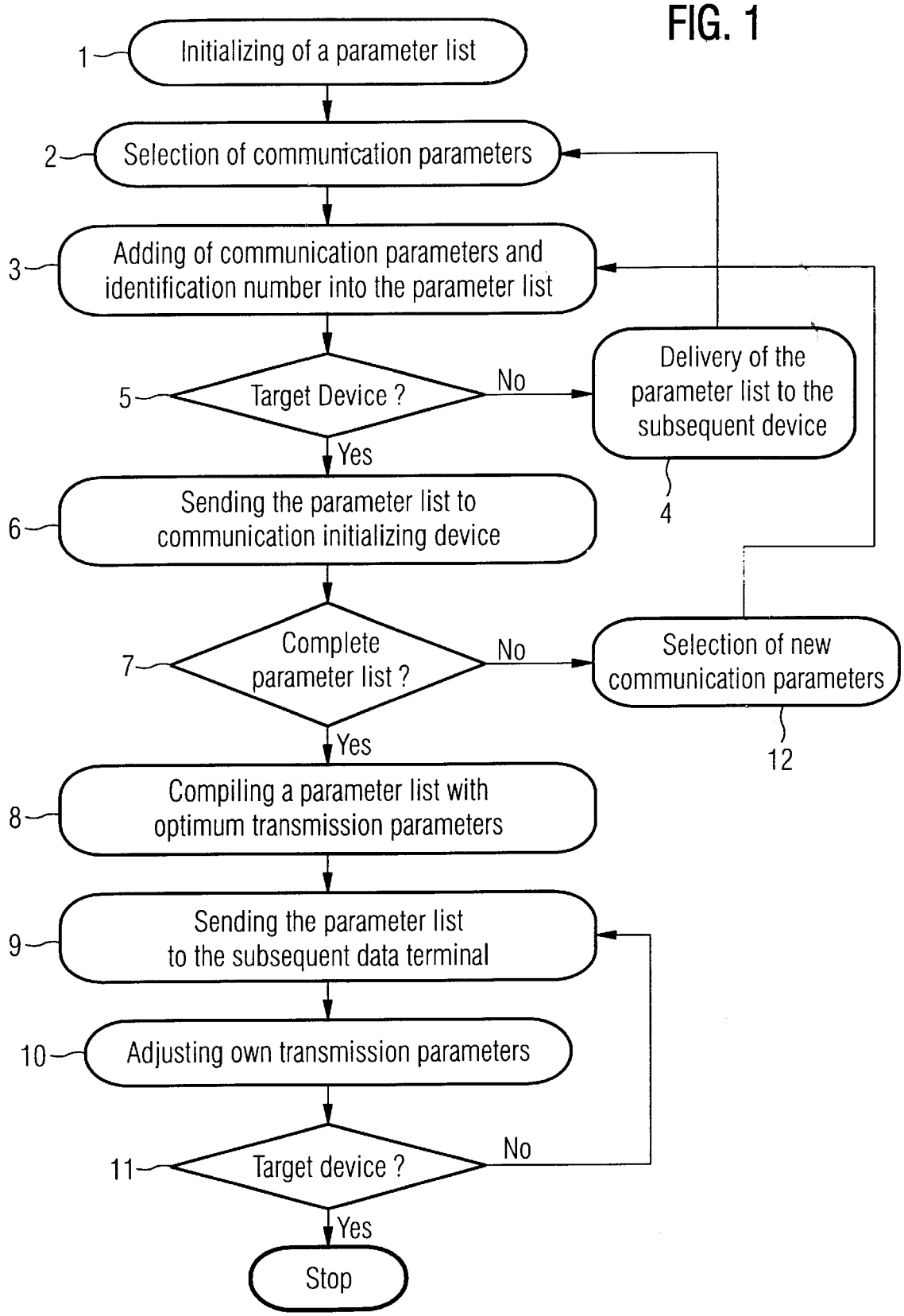
FIG. 1: a flowchart of an inventive method according to claim 1.

In a method for the optimized negotiation of communication parameters for a transmission of data in communication links, a parameter list is in a first step provided by a first device, according to FIG. 1. Hereby, an optimum combination of the parameters is selected in view of the transmission alternatives of said device in step 2. Said parameters are added to the provided list—step 3—and consequently said list together with the number identifying said unit, the so-called ID, is delivered to the next communication device—step 4. This takes place after it had been checked, whether a target device has already been reached—step 5. If it has not yet been reached, the parameter list is delivered further. Each communication device adds its communication parameters and its ID to the list received. In this respect it has to be noted that the entries of the list received are not modified, but that the new parameters are appended at the bottom of the list and are thus added. When receiving the list it is checked first, whether the already existing parameters are supported by said unit. In case of incompatibility the device attempts to adjust to the already existing parameters by selecting the best parameters. If an agreement of parameters seems impossible, it is marked in the list by an entry by indicating the settings supported by said device.

The parameter list can be regarded as a data structure, which is dynamically administered in each data terminal equipment due to the increasing number of data. The transmission can, for instance, be done in the form of a simple ASCI text. Said text can be packaged into exactly identifiable packets, the formats of which can correspond to the format of the so-called PPP (point to point protocol). The so-called PPP is a standard protocol, which is used for transmitting data packets. Thus, the method for negotiating transmission parameters as suggested by the invention can be integrated into the PPP phase of a connection set-up. Said embodiment is, however, to be regarded as an example only.

According to FIG. 1 the transmission of the parameter list is continued until the target device is reached—step 5. When receiving the parameter list, the target device adds its communication parameters and its ID to the list and provides a complete parameter list. As a consequence, said list is sent to the communication initializing device—step 6. By means of the parameters contained in the list a decision is made in the first device, as to whether a connection via all devices involved in the communication is feasible—step 7. In case of a positive result, an optimum selection of transmission parameters is implemented—step 8.

After the selection is made, a complete parameter list is provided and is sent to the subsequent device involved in the transmission—step 9—for informing it on the selection made. Said information is consequently transmitted to all devices one after the other. Each device configures its parameter setting for a corresponding connection by means of the parameter list received—step 10. Thus, the devices involved in the communication are configured. Upon a successfully terminated setting of the transmission parameters in all devices—step 11, the transmission phase can start.

If the communication initializing device is not in a position to provide a selection of operating transmission parameters, it initiates again a parameter negotiation phase including a new suggestion of transmission parameters—step 12. Theoretically, the number of attempts can be endless, unless one of the data terminal equipment involved in the transmission indicates that it wishes termination upon a specified number of failed attempts. This information is delivered to the communication initializing device and to the target device implying the disconnection of the connection set-up phase. From the monitoring data files running in the background, reports on the process and abort of the connection are generated, which can be used by the involved subscribers for finding the cause of the problem.

An example for using a device for an optimized negotiation of communication parameters in a transmission of data between communication initializing user USER_A and a target device USER_B is explained in more detail below by means of FIGS. 2a, b, c.

According to FIG. 2a, a means for initializing a parameter list being contained in the communication initializing device USER_A provides for a list. By using means for adding own communication parameters, own parameters PAR_USER_A are added to said list. By using a first sending means, said list is sent to a subsequent device ADAP_A. A receiving means, which is provided in each device, receives the list and delivers it to an evaluating means. Said evaluating means decides on the compatibility of the own parameters and the parameters contained in the list. The implementation of the means for evaluating a parameter list can be done in the form of software, whereby different alternatives for selection criteria can be provided. Said evaluating means can orientate themselves by their specified parameters and they can check, whether the devices involved in the communication agree with the suggested parameters. Another alternative for selection is to relate the decision to the majority. In other words, it is determined in how many cases the identical setting in view of a parameter was made. In any case, the unit selects only parameters being supported by it. According to FIG. 2a the list is supplemented and delivered further until the target device USER_B is reached. The parameter list is hereby delivered to the target device PC_B via an intermediate node, InterNod, and an additional adapter; ADAP_B. Both, the intermediate node, InterNod and the additional adapter, ADAP_B add own communication parameters PAR_InterNod and PAR_ADAP_B.

According to FIG. 2b, which follows the steps implemented in FIG. 2a in terms of time, the list received is sent in a target device USER_B to the communication initializing device by using a second sending means. Upon receipt of the list in the communication initializing unit, it is delivered to the selecting means. It is the task of said means to first find out, whether a connection with the parameters contained in the list is feasible via all devices involved in the communication. If an optimized selection of parameters is made by the selecting means of at least one communication parameter, an optimized parameter list ParList is provided and sent one after the other, according to FIG. 2c, to all devices involved in the communication. FIG. 2c accordingly follows FIG. 2b in terms of time. Upon receipt of the parameter list, said list is sent to the configuration means, the task of which it is to configure the transmission parameters for the corresponding data transmission.

In the following, an example of applying the invention is described by means of FIG. 3 and table 1.

Figure 3:
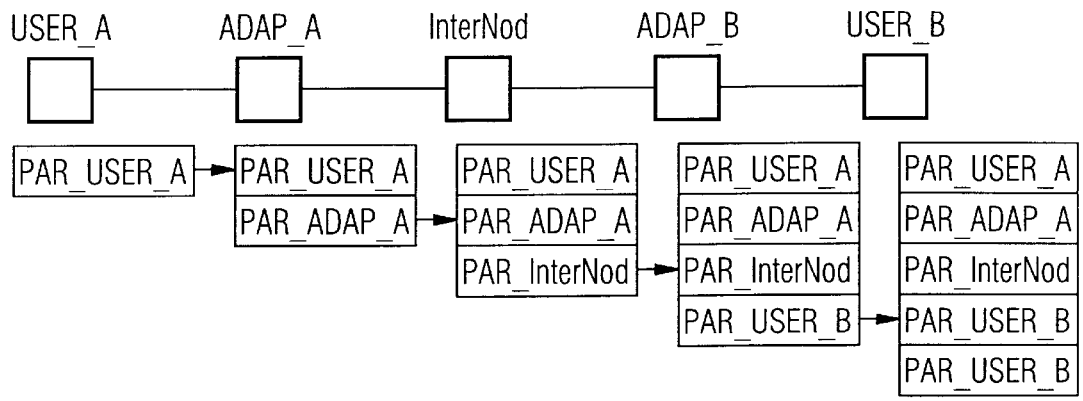
FIG. 3: an illustration of an embodiment for a communication between two GSM users.

FIG. 3 is an example of applying the invention for a parameter negotiation between two GSM users. Table 1 shows an example of the possible communication parameters, which can be selected by the respective data terminal equipment.

| Designation of the parameters | Transmission parameters of the respective device, characterized by ID | |
| --- | --- | --- |
| PAR_PC_A | user rate | 9.6 kbit/s |
| | number of data bits | 8 |
| | parity | none |
| | number of stop bits | none |
| | duplex | fully duplex |
| | ID | PC_A |
| PAR_MS_A | information transfer capability | 3.1 khz |
| | radio channel requirement | full rate |
| | duplex | fully duplex |
| | sync/async | asynchronous |
| | user rate | 9.6 kbit/s |
| | number of data bits | 8 |
| | parity | none |
| | GSM intermediate rate | 16 kbit/s |
| | type of modem | V.32 |
| | number of stop bits | none |
| | connection element | non-transparent |
| | ID | PCMCIA_A |
| PAR_IWF_A | information transfer capability | 3.1 khz |
| | transfer mode | circuit |
| | ISDN transfer rate | 64 kbit/s |
| | sync/async | asynchronous |
| | user rate | 9.6 kbit/s |
| | number of data bits | 8 |
| | parity | none |
| | duplex | fully duplex |
| | number of stop bits | none |
| | ID | IWF_A |
| PAR_IWF_B | information transfer capability | 3.1 khz |
| | radio channel requirement | full rate |
| | duplex | fully duplex |
| | sync/async | asynchronous |
| | user rate | 9.6 kbit/s |
| | number of data bits | 8 |
| | parity | none |
| | GSM intermediate rate | 16 kbit/s |
| | number of stop bits | none |
| | connection element | non-transparent |
| | ID | IWF_B |
| PAR_MS_B | user rate | 9.6 kbit/s |
| | number of data bits | 8 |
| | parity | none |
| | number of stop bits | none |
| | duplex | fully duplex |
| | ID | PCMCIA_B |

The communication initializing user PC_A initiates a connection in that a list of his communication parameters PAR_PC_A is generated and sent to the PCMCIA card. This is the device which guarantees the data transmission between a computer and a mobile phone. Due to the fact that its parameter setting depends on the connected mobile phone, it has not been explicitly shown in FIG. 3 and is in the following taken into account in connection with mobile phone.

The PCMCIA card adds its own parameters PAR_MS_A to the list received.

Consequently; all data are sent to the switching center MSC_A in form of a list. At his point, in particular in the InterWorking Function part IWF_A of the switching center, a translation and an adjustment of the parameters to the transmission technique of the connected network takes place. An ISDN network is concerned in this embodiment. Due to the digital transmission technique of ISDN a translation of the bearer capability from GSM to ISDN takes place in the converting node (InterWorking Function). In addition, own transmission parameters PAR_IWF_A are added to the list in the InterWorking Function IWF_A.

Furthermore, said list is delivered to MSC_MSC_B responsible for the mobile target device. Here again, an adjustment of parameters between the received ISDN connection and the GSM switching center takes place. In this embodiment, the InterWorking Function IWF_B can find out by means of the ID's of the already reached data terminal equipment that a symmetric connection is concerned. This means, due to the fact that the communication takes place between two GSM subscribers, which are coupled with each other via an ISDN network, a symmetry occurs in the devices involved in the connections. Despite the symmetry a check of the already suggested parameters is effected also at this point.

Upon the check, the list is sent to a PCMCIA card MS_B. Said card is the last one which has to decide on the configuration parameters, whereupon, after the own parameters PAR_MS_B have been added, the complete parameter list is sent to the communication initializing device PC_A. It is important that information are never overwritten. Only information are added. This makes sure that no information is lost.

Table 1 can be regarded as a complete list, which is sent to the communication initializing device PC_A.

Upon receipt of the parameter list, the communication initializing device decides as to which compilation of parameters corresponds best with the given facts in view of the connection. In this case, the communication initializing device compares all parameters set by the data terminal equipment involved in the connection, in order to produce an optimal combination. The table illustrated below shows an example of the parameters selected by the communication initializing device. In this example, no conflicts occur. Thus, the list of parameters is simply the sum of all individual parameters.

| Final parameter list | |
| --- | --- |
| user rate | 9.6 kbit/s |
| number of data bits | 8 |
| parity | none |
| duplex | fully duplex |
| number of stop bits | none |
| information transfer capability | 3.1 khz |
| transfer mode | circuit |
| radio channel requirement | full rate |
| synch/async | asynchronous |
| GSM intermediate rate | 16 kbit/s |
| ISDN transfer rate | 64 kbit/s |
| type of connection | non-transparent |

Upon the complete compilation of parameters the list is sent to all units involved in the connection. Each unit infers from the received table only the entries relevant for itself according to which the connection for the subsequent data transmission is configured.

Figure 4:
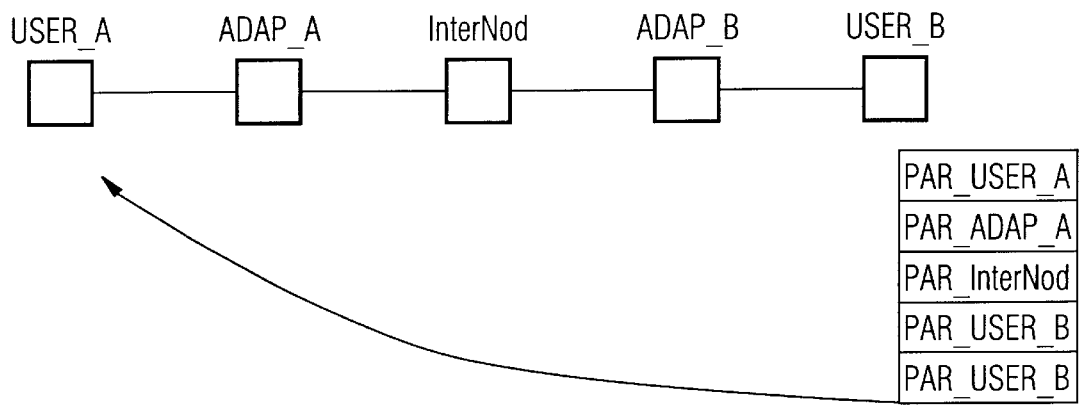
FIG. 4: an illustration of an embodiment for a communication between a GSM and a conventional network.

FIG. 4 illustrates another example of applying the invention. In this case a connection between a GSM network PC_C and an analog telephone network PC_D is concerned. In contrast to be above-mentioned example, the InterWorking Function IWF_A notes that the connection to an analog subscriber is to be set up, and this causes it to select the parameters listed under PAR_IWF_C, which relates to an analog line. This particularly means that a conversion of digital signals into analog ones takes place in the InterWorking Function. A modem integrated into the InterWorking Function is responsible therefor. This is why the parameters PAR_IWF_C include the type of modem

| Designation of the parameters | Transmission parameters of the respective device, characterized by ID | |
| --- | --- | --- |
| PAR_PC_C | user rate | 9.6 kbit/s |
| | number of data bits | 8 |
| | parity | none |
| | number of stop bits | none |
| | duplex | fully duplex |
| | ID | PC_A |
| PAR_MS_C | information transfer capability | 3.1 khz |
| | radio channel requirement | full rate |
| | duplex | fully duplex |
| | sync/async | asynchronous |
| | user rate | 9.6 kbit/s |
| | number of data bits | 8 |
| | parity | none |
| | GSM intermediate rate | 16 kbit/s |
| | type of modem | V.32 |
| | number of stop bits | none |
| | connection element | non-transparent |
| | ID | PCMCIA_A |
| PAR_IWF_C | type of modem | V.32 |
| | user rate | 9.6 kbit/s |
| | sync/async | asynchronous |
| | number of data bits | 8 |
| | parity | none |
| | number of stop bits | none |
| | duplex | fully duplex |
| | ID | IWF_A |
| PAR_Modem D | user rate | 9.6 kbit/s |
| | number of data bits | 8 |
| | parity | none |
| | number of stop bits | none |
| | duplex | fully duplex |
| | ID | Modem_B |

Figure 5:
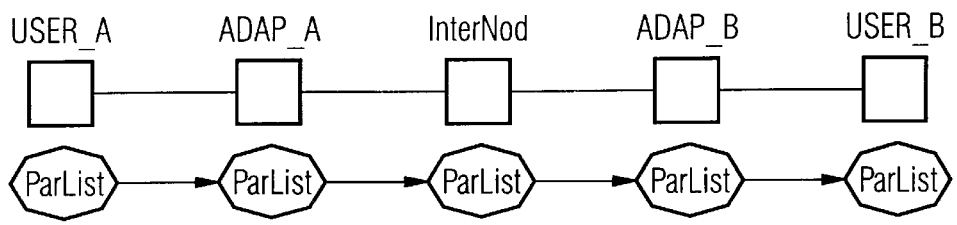
FIG. 5: an illustration of an embodiment for a communication between a conventional telephone network and a GSM network.

Another embodiment is explained by means of FIG. 5 and table 3. It relates to an application, wherein a PSTN user PC_E sets up a connection to a GSM user PC_F. The complete parameter list is presented in the following table.

| Designation of the parameters | Transmission parameters of the respective device, characterized by ID | |
| --- | --- | --- |
| PAR_Modem-E | user rate | 32 kbit/s |
| | number of data bits | 8 |
| | parity | none |
| | duplex | fully duplex |
| | number of stop bits | none |
| | type of modem | auto-bounding |
| | ID | PC_A |
| PAR_IWF_F | information transfer rate | 3.1 khz |
| | radio channel requirement | full rate |
| | duplex | fully duplex |
| | sync/async | asynchronous |
| | user rate | 9.6 kbit/s |
| | number of data bits | 8 |
| | parity | none |
| | GSM intermediate rate | 16 kbit/s |
| | connection element | non-transparent |
| | number of stop bits | none |
| | type of modem | V.32 |
| | ID | IWF_B |
| PAR_MS_F | user rate | 4.8 kbit/s |
| | number of data bits | 8 |
| | parity | none |
| | number of stop bits | none |
| | duplex | fully duplex |
| | ID | PCMCIA_B |

As can be inferred from table 3, PAR_Modem_E, a modem is available to the PSTN user, the transmission rate of which is 32 kbit/s. In addition, the auto-baunding is set as modem type.

Said parameter list is sent to the InterWorking Function IWF_F. Said data terminal equipment first recognizes that the call is to be delivered to a GSM network the transmission rate of which is 9.6 kbit/s. This results in that the payload rate is reduced to the smaller value (PAR_IWF_F). Moreover, the set modem type constitutes a problem, namely the auto-baunding. Said setting is not supported in the illustrated example by the InterWorking Function. From its part, it accordingly suggests modem type V.32 as possible setting.

Upon adding own parameters PAR_IWF_F, the parameter list is sent from the InterWorking Function IWF_F to the mobile phone MS_F of the GSM user PC_F. The parameters of the terminal PAR_MS_F, however, permit a transmission rate of 4.8 kbit/s at most in the example. In other words, the value is again smaller than that originally set by PC_E.

Said value is entered into the parameter list PAR_MS_F. Upon adding its own parameters PAR_MS_F, the complete parameter list is sent to the communication initializing device PC_E, which makes a decision on the parameter selection. This particularly means that it has to decide whether the service selected by it can be implemented at that transmission rate 4.8 kbits/s, as this is the only value being supported on the transmission path by all devices. In case that said connection parameters do not meet the minimum requirements of the service, the user can decide to discontinue with the transmission of the data, and he can terminate the already set up connection.

The implementation of the examples requires that a minimum connection between the communicating units is already present. A minimum connection in this respect means that the opposite terminals are connected with each other via a connection, which, even though it is not sufficient for an exchange of data, is enough to determine the hardware, e.g. digital or analog, of the opposite terminal.

This can be realized by means of the following suggestion. The ITU-T V.32 modem type has been standardized since 1998, i.e. all analog modems can be configured in view of this standard. The frame conditions for the digital connections are clearly set by the below-listed parameters. It is feasible to set up a minimum connection to an opposite terminal by using the following parameters: An asynchronous connection of 4.8 kbit/s being the transmission rate. Moreover, the data are coded to 8 bits without setting a parity bit. This implies that parameters are selected, which are supported by nearly all practically existing communication devices. Even though no optimum data transmission can be realized by means of said parameters, they are sufficient for exchanging some hundred bytes of information. In principle, a connection can always be implemented by means of the mentioned parameters. The only prerequisite therefor is that the connected line is monitored for incoming data on the communicating devices.

In the examples listed, different heterogeneous network connections were mentioned. Preferably connections between digital and analog networks were taken into account. The invention may, however also be applied to other heterogeneous connections, e.g. to a connection between line-oriented and packet-oriented networks. Moreover, it should be consider that due to the fact that the kind and number of communication parameters depend on the underlying network, not all communication parameters were involved. The invention, however, can be applied to all communication parameters, which have to be negotiated during the connection set-up phase.

What is claimed is:

1. A method for optimized negotiation of communication parameters in transmission of data in communication links, said method comprising the steps of:
   a parameter list is initialized in a first device;
   at least one additional device involved in the transmission adds its own communication parameters to the parameter list and sends the parameter list to a subsequent device involved in the transmission;
   the parameter list received by a target device is sent back to the first device;
   the first device selects at least one communication parameter; and
   the selection of at least one communication parameter is communicated to the additional devices involved in the transmission.

2. The method according to claim 1, wherein each communication device is identified by an exact identification number.

3. The method according to claim 1, wherein each communication parameter is identified by a standardized name.

4. The method according to claim 3, wherein the kind and number of communication parameters depend on a communication network used.

5. The method according to claim 4, wherein the communication network is a digital, an analog, a packet-oriented or a line oriented network.

6. The method according to claim 5, wherein a heterogeneous connection consists of at least two communication networks.

7. The method according to claim 5, wherein the parameter list contains the identification number and the communication parameters of each communication device passed.

8. The method according to claim 6, wherein a communication parameter is not overwritten in the subsequent communication device.

9. The method according to claim 7, wherein a negotiation of the communication parameters is implemented in a connection set-up phase.

10. The method according to claim 8, wherein a new negotiation is initiated in case of an unsuccessfully implemented parameter negotiation.

11. The method according to claim 1, wherein the method is used on negotiation of parameters in connections, the parameters being passed via an ISDN network from a first GSM network to a second GSM network.

12. The method according to claim 1, wherein the method is used for negotiating parameters in connections, the parameters being passed from a GSM network to a PSTN network.

13. The method according to claim 1, wherein the method is used for negotiating parameters in connections, the parameters being passed from a PSTN to a GSM network.

14. A method of configuring a communication link between a first device and a second device, said method comprising the steps of:

initializing a parameter list in said first device;

adding, to the parameter list, communication parameters of at least one additional device included in the communication link between said first device and said second device;

adding, to the parameter list, communication parameters of said second device;

forwarding said parameter list from said second device to said first device; and determining, based on the forwarded parameter list, whether the communication link between said first device, said at least one additional device, and said second device is feasible;

wherein said parameter list includes a data structure, said first device further includes a communication initializing device, and said second device further includes a target device.

15. The method of claim 14, wherein if said determining step is determined to be feasible, said method further including:

selecting an optimum set of communication parameters from the forwarded parameter list;

forwarding the optimum set of communication parameters from said first device to the at least one additional device and said second device; and configuring said first device, said at least one additional device and said second device using the forwarded optimum set of communication parameters; and commencing data transmission over the communication link between said first device and said second device.

16. The method of claim 14, wherein if said determining step is determined not to be feasible, said method further including a step of initiating, with said first device, another parameter negotiation phase including a new suggestion of communication parameters.

17. The method of claim 14, wherein said method is integrated into a point-to-point protocol phase of a connection set-up.

18. The method os claim 14, wherein the forwarded parameter list further includes an identification number and the communication parameters of each device passed.

* * * * *